United States Patent Office 2,864,632
Patented Dec. 16, 1958

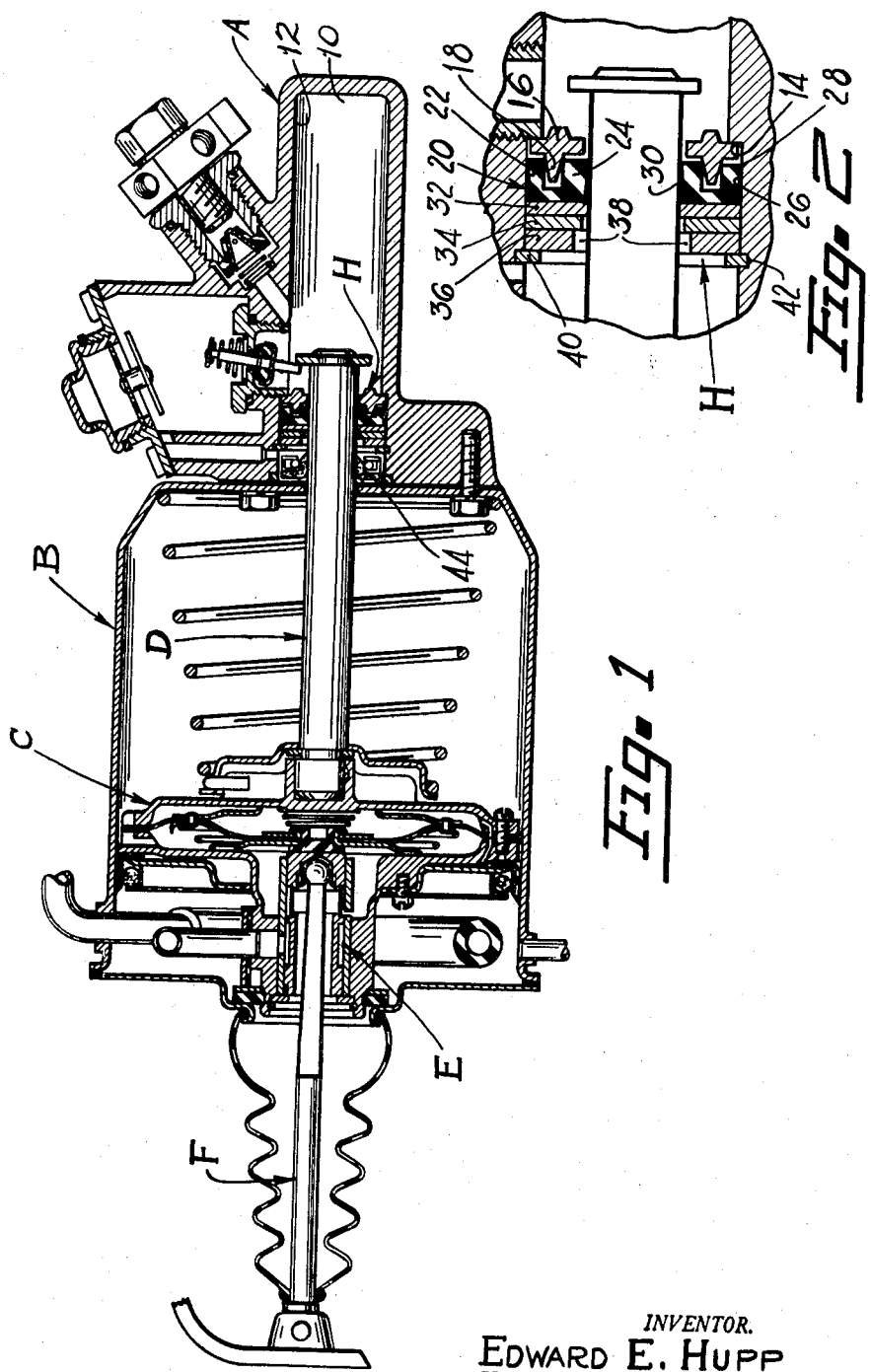

2,864,632

POWER OPERATED MASTER CYLINDER

Edward E. Hupp, South Bend, Ind., assignor to Bendix Aviation Corporation, South Bend, Ind., a corporation of Delaware Application February 1, 1956, Serial No. 562,784

4 Claims. (Cl. 286—26)

The present invention relates to equipment for generating fluid pressures and more particularly to hydraulic master cylinders for automobiles and the like.

An object of the present invention is the provision of a new and improved fluid pressurizing device of the type which uses an annular packing of U-shaped cross-section made from a yieldable material as a seal between a reciprocable fluid displacement member and a surrounding surface, and which further comprises retaining means for the U-packing which considerably improves the service life of the packing when the device is used for developing extremely high fluid pressures.

Another object of the invention is the provision of new and improved fluid pressure sealing means for fluid pressurizing devices having a cylindrical fluid displacement member extending into a cylindrical bore and comprising an annular cup-shaped U-packing of yieldable material positioned between the fluid displacement member and the surface of the bore, and an axially outwardly positioned annular disc extending between the surface of the fluid displacement member and the surface of said bore and adapted to expand radially against said surfaces when pressure is applied against said packing.

Another object of the invention is the provision of new and improved fluid pressure sealing means for fluid pressurizing devices having a cylindrical fluid displacement member extending into a cylindrical bore and comprising an annular cup-shaped U-packing positioned between the fluid displacement member and the surface of said bore with the legs of the U extending axially inwardly, a first annular disc positioned against the axially outer surface of said U-packing and extending between the surface of the fluid displacement member and the surface of said bore, and a second generally rigid annular disc made from a non-scoring material and positioned against the axially outer surface of said first annular disc, the radially inner surface of said second annular disc being spaced slightly from said displacement member to provide a running clearance therewith and the radially outer surface being in substantial engagement with the surface of said bore, and said first annular disc being adapted to expand radially against the surface of said bore and said displacement member when fluid pressure is exerted against said U-packing.

Further objects and advantages will be apparent to those skilled in the art to which the invention relates from the following description of the preferred embodiment described with reference to the accompanying drawings forming a part of this specification and in which:

Figure 1 is a longitudinal cross-sectional view of a preferred embodiment of the invention; and Figure 2 is an enlarged fragmentary cross-sectional view of a portion of the device shown in Figure 1.

Figure 1 of the drawing represents a power operated master cylinder of the type used in hydraulic braking systems of automobiles and the like. The power operated master cylinder comprises a hydraulic cylinder A positioned on one end of a pneumatic fluid pressure servo-motor B having therein a movable wall C adapted to operate a fluid displacement member D which projects into the adjacent end of the hydraulic cylinder A. Movement of the movable wall C is controlled by valve E located on the movable wall and adapted to regulate the pressure differential applied across the movable wall. Actuation of the valve E is performed by a control member F which projects externally of the servo-motor B to be moved by the foot of the operator. Movement of the control member F into the servo-motor B causes the control valve E to close its atmospheric valve and open its vacuum valve to admit vacuum to the chamber of the servo-motor B positioned between the movable wall C and the hydraulic cylinder A thereby causing the piston C to force the fluid displacement member D into the hydraulic cylinder A, forcing the hydraulic fluid normally contained therein into an attached hydraulic system, as for example the braking system of an automobile.

According to the provisions of the present invention there is provided in the power operated master cylinder shown in the drawing a new and improved fluid pressure sealing means H between the fluid displacement member D and the open end of the fluid pressure chamber 10 of the hydraulic cylinder A. The end of the fluid pressure chamber 10 is counterbored as at 12 to provide a smooth cylindrical surface which terminates in an inwardly positioned shoulder 14. An annular retaining ring 16 is positioned in the inner end of the counterbore 12 against the shoulder 14 and is provided with an axially outwardly extending annular projection 18 positioned approximately midway in the annular space between the fluid displacement member D and the surface of the counterbore 12. An annular cup-shaped U-packing 20 having an axially extending or horizontal generally U-shaped cross-section is positioned axially outwardly of the retaining ring 16 with its axially extending legs 22 and 24 positioned radially outwardly and inwardly, respectively, of the projection 18. The projection 18 is adapted to bear against the base of the U-shaped section or main body portion 26 of the U-packing 20 and the legs 22 and 24 are made slightly diverging such that when the ring is positioned in the counterbore 12, the legs 22 and 24 bear against the surface of the counterbore 12 and fluid displacement member D, respectively. The U-packing 20 is normally made of rubber or some other resilient material such that pressure inside the U-shaped portion of the packing forces the legs 22 and 24 against the surface of the counterbore 10 and fluid displacement member D, respectively. It will be seen that the radially outer and inner surfaces 28 and 30 present cylindrical surfaces which engage the cooperating surfaces of the counterbore 10 and fluid displacement member D, respectively, for the full width of the packing, and that the axially outer surface of the U-packing 20 presents a flat annular surface by which the resilient U-packing 20 may be held in place.

It is a provision of the present invention to provide an annular back-up disc 32 for the resilient U-packing 20 of an O. D. which will engage the surface of the counterbore 10 and of an I. D. which will engage the surface of the fluid displacement member D, and which is made from a material which will not gall the surface of the fluid displacement member D and which will not interfere with the sealing function of the resilient U-packing ring 20. It is further desired that the ring should be made from a material having considerable strength and still be capable of "growing" radially such that the radially inner surface of the back-up disc 32 will be maintained in contact with the fluid displacement member D even though wear has taken place. Any material having the above characteristic may be used for the back-up disc 32 and it has been found that a back-up disc made from a proper grade of leather is particularly desirable, and accordingly, the back-up disc 32 of the preferred embodiment shown in the drawing is made from leather.

The back-up disc 32 is held in place by a non-galling support disc 34 whose radially outer surface engages the surface to the counterbore 10 to center the disc and whose radially inner surface is spaced from the fluid displacement member D a sufficient distance to provide a running clearance. The support disc 34 shown in the drawing is made from spauldite which is a fabric impregnated with a thermal setting resin and is provided with a running clearance with respect to the fluid displacement member of approximately .002 of an inch. The support disc 34 is held in place by a second supporting or back-up disc 36 made from metal and having a sufficiently large opening 38 through which the fluid displacement membed D extends to preclude any possibility of the metallic second support disc 36 contacting the fluid displacement member and thereby galling its surface.

The parts of the above described fluid pressure sealing means H are compressed slightly during assembly and are held in abutting relationship by means of a snap ring 40 seated in an annular groove 42 in the counterbore 10, and the vacuum seal 44 in the outer end of the counterbore prevents air from entering the power chamber of the servo-motor.

During operation of the power-operated master cylinder, the fluid displacement member D is driven into fluid pressure chamber of the hydraulic cylinder A. The legs 22 and 24 of the resilient U-packing 20 are forced against the surface of the counterbore 10 and the fluid displacement member D, respectively, by the developed pressure, and the U-packing 20 is forced axially outwardly against the leather back-up ring 32. As previously indicated, the leather back-up ring 32 is adapted to "grow" radially when pressure is applied in the above manner to maintain engagement with the fluid displacement member D even though wear has taken place. This prevents the resilient U-packing 20 from becoming distorted such that it maintains its effectiveness at high pressures, and such that it is prevented from being extruded past the support disc 34.

It will be apparent that the objects heretofore enumerated as well as others have been accomplished and that there has been provided a new and improved fluid pressurizing device having fluid pressure sealing means comprising a resilient cup-shaped U-packing and supporting structure having improved service life characteristics at high pressures.

While the preferred embodiment of the invention has been described in considerable detail, I do not wish to be limited to the particular constructions shown which may be varied within the scope of the invention, and it is the intention to cover hereby all adaptations, modifications, and arrangements thereof which come within the practice of those skilled in the art to which the invention relates.

I claim:

1. In a fluid pressurizing device for automotive braking systems and the like having a cylindrical bore into which a cylindrical fluid displacement member extends, pressure sealing means comprising an annular retaining ring positioned between said fluid displacement member and the side walls of said bore and having an axially outwardly extending annular projection thereon, an annular U-packing positioned axially outwardly of said annular retaining ring and having a pair of axially inwardly extending annular projections one positioned radially inwardly and the other radially outwardly of said projection on said retaining ring, a first annular semi-rigid non-galling back-up disc positioned axially outwardly of said annular U-packing with its radially outer surface contacting the surface of said bore and its radially inner surface contacting the surface of said displacement member, a second annular disc positioned axially outwardly of said first annular disc with its radially outer surface substantially in contact with the surface of said bore and its radially inner surface spaced slightly from said displacement member, and means forming a shoulder axially outwardly of said second disc for supporting said second disc, said last mentioned means having an opening therethrough through which said fluid displacement member extends, said U-packing and said first annular disc being confined between said retaining ring and said second annular disc, and said U-packing, first disc, second disc, and last mentioned means being of materials which progressively increase in stiffness and strength; and the openings in said first, second disc, and last mentioned means gradually increasing from a size in said first disc having no clearance with said displacement member, to a size in said second disc providing a running fit therewith, to a size large enough in said last mentioned means so that said fluid displacement member does not contact the sidewalls of its opening.

2. In a hydraulic master cylinder and the like having a cylindrical bore into which a cylindrical fluid displacement member extends, pressure sealing means comprising an annular retaining ring positioned between said fluid displacement member and the side walls of said bore and having an axially outwardly extending annular projection thereon, a resilient annular U-packing positioned axially outwardly of said annular retaining ring and having a pair of axially inwardly extending annular projections one positioned radially inwardly and the other radially outwardly of said projection on said retaining ring, a first annular semi-rigid non-galling back-up disc positioned axially outwardly of said annular U-packing with its radially outer surface contacting the surface of said bore and its radially inner surface contacting the surface of said displacement member, a second annular rigid disc made from a non-galling material and positioned axially outwardly of said first annular disc with its radially outer surface substantially in contact with the surface of said bore and its radially inner surface spaced slightly from said displacement member, and a third annular disc positioned axially outwardly of said second annular disc with its radially inner surface spaced from said displacement member, said U-packing and said first and second annular discs being confined between said retaining ring and said third annular disc; said first annular disc being made from a material which expands radially under the axial compressive forces exerted thereon by said U-packing to compensate for wear produced by said fluid displacement member during operation of the master cylinder; said U-packing, first, second and third discs being of materials which progressively increase in stiffness and strength; and the openings in said first, second and third discs gradually increasing from a size in said first disc having no clearance with said displacement member, to a size in said second disc providing a running fit therewith, to a size large enough in said third disc so that said fluid displacement member does not contact its sidewalls.

3. In a hydraulic master cylinder and the like having a cylindrical bore into which a cylindrical fluid displacement member extends, pressure sealing means comprising an annular retaining ring positioned between said fluid displacement member and the side walls of said bore and having an axially outwardly extending annular projection thereon, a resilient annular U-packing positioned axially outwardly of said annular retaining ring and having a pair of axially inwardly extending annular projections one positioned radially inwardly and the other radially outwardly of said projection on said retaining ring, a first annular leather disc positioned axially outwardly of said annular U-packing with its radially outer surface contacting the surface of said bore and its radially inner surface contacting the surface of said displacement member, a second annular rigid disc made from a non-galling material and positioned axially outwardly of said first annular disc with its radially outer surface substantially in contact with the surface of said bore and its radially inner surface spaced slightly from said displacement member, and a third annular disc positioned axially outwardly of said second annular disc with its radially inner surface spaced from said displacement member, said U-packing and said first and second annular discs being confined between said retaining ring and said third annular disc, and said U-packing, and first, second and third discs being of materials which progressively increase in stiffness and strength; and the openings in said first, second and third discs gradually increasing from a size in said first disc having no clearance with said displacement member, to a size in said second disc providing a running fit therewith, to a size large enough in said third disc so that said fluid displacement member does not contact its sidewalls.

4. In a hydraulic master cylinder and the like having a cylindrical bore into which a cylindrical fluid displacement member extends, pressure sealing means comprising an annular retaining ring positioned between said fluid displacement member and the side walls of said bore and having an axially outwardly extending annular projection thereon, an annular synthetic rubber U-packing positioned axially outwardly of said annular retaining ring and having a pair of axially inwardly extending annular projections one positioned radially inwardly and the other radially outwardly of said projection on said retaining ring, a first annular leather disc positioned axially outwardly of said annular U-packing with its radially outer surface contacting the surface of said bore and its radially inner surface contacting the surface of said displacement member, a second annular plastic impregnated fabric disc positioned axially outwardly of said first annular disc with its radially outer surface substantially in contact with the surface of said bore and its radially inner surface spaced slightly from said displacement member, and a third annular disc positioned axially outwardly of said plastic impregnated fabric disc with its radially inner surface spaced from said displacement member, said U-packing and said first and second annular discs being confined between said retaining ring and said third annular disc, said first annular leather disc being expandable radially to maintain contact with said fluid displacement member and the surface of said bore upon application of pressure to said U-packing; said U-packing, and first, second and third discs being of materials which progressively increase in stiffness and strength; and the openings in said first, second and third discs gradually increasing from a size in said first disc having no clearance with said displacement member, to a size in said second disc providing a running fit therewith, to a size large enough in said third disc so that said fluid displacement member does not contact its sidewalls.

References Cited in the file of this patent

UNITED STATES PATENTS

| | | |
|---|---|---|
| 796,211 | Holmes | Aug. 1, 1905 |
| 1,829,451 | McNab | Oct. 27, 1931 |
| 2,106,758 | Oliver | Feb. 1, 1938 |
| 2,794,662 | Reynolds | June 4, 1957 |

FOREIGN PATENTS

| | | |
|---|---|---|
| 235,095 | Switzerland | Mar. 1, 1945 |
| 263,086 | Great Britain | Mar. 10, 1927 |